United States Patent [19]

Baugh

[11] 4,403,467

[45] Sep. 13, 1983

[54] ROW DIVIDER WITH FLEXIBLE PLASTIC SHEATH

[75] Inventor: Robert T. Baugh, Brookfield, Wis.

[73] Assignee: Allis-Chalmers Corporation, Milwaukee, Wis.

[21] Appl. No.: 426,985

[22] Filed: Sep. 29, 1982

[51] Int. Cl.³ ........................................... A01D 45/02
[52] U.S. Cl. .......................................... 56/119; 56/98; 56/106
[58] Field of Search ....................... 56/94, 95, 98, 119, 56/106

[56] References Cited

U.S. PATENT DOCUMENTS 3,520,121 7/1970 Ashton et al. .................... 56/106
3,765,157 10/1973 Hyman et al. ................... 56/105

Primary Examiner—Gene Mancene
Assistant Examiner—David I. Tarnoff
Attorney, Agent, or Firm—Charles L. Schwab

[57] ABSTRACT

A divider structure for a row crop harvester which includes a hood (8) and point (9) having flexible plastic sheathing (106, 37) supported on subframes (12, 13) which in turn are mounted on adjacent row units (131, 132).

7 Claims, 5 Drawing Figures

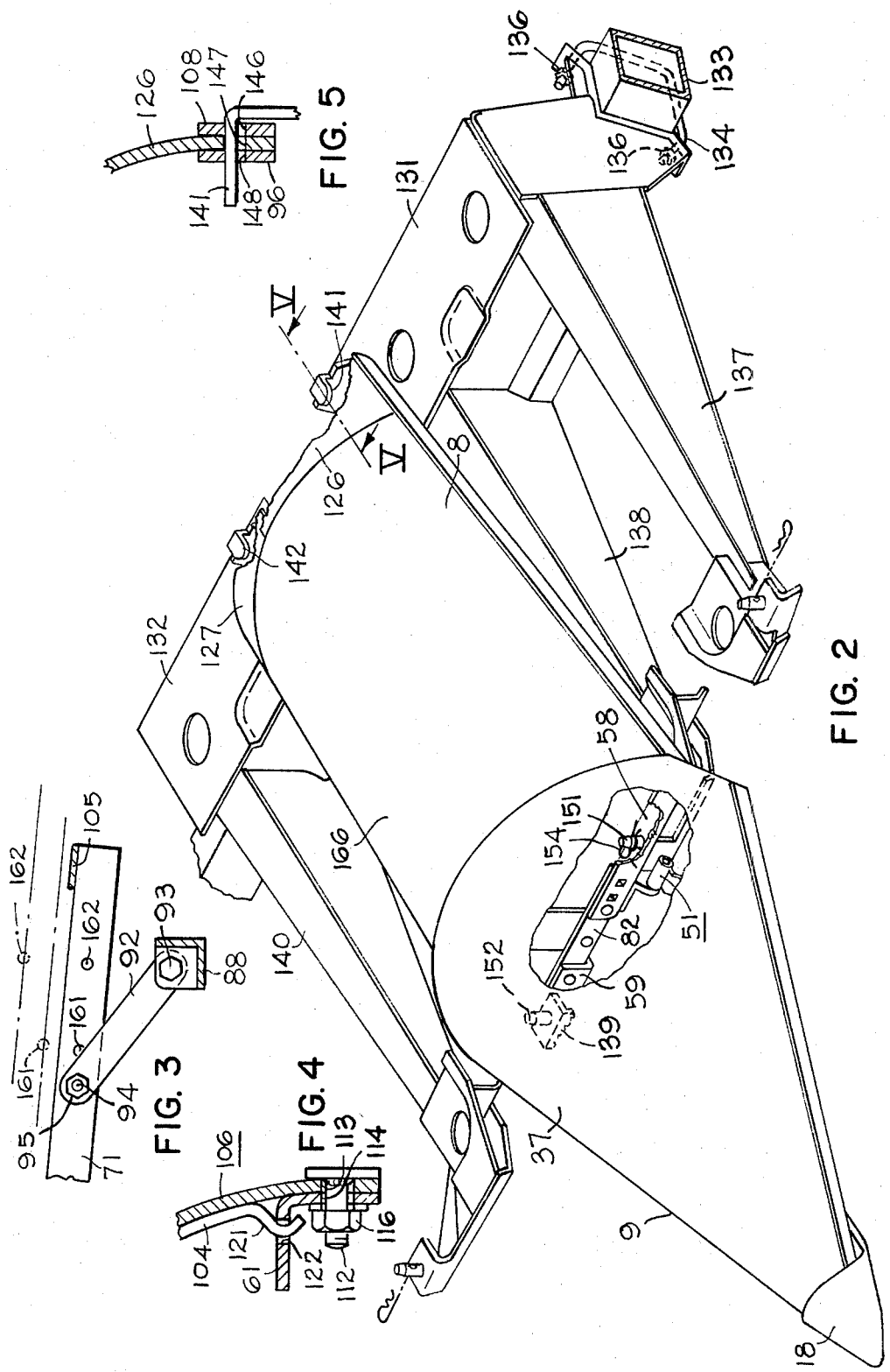

ical mid portions by the adjustable vertical support 34.

ROW DIVIDER WITH FLEXIBLE PLASTIC SHEATH

BACKGROUND OF THE INVENTION

1. Technical Field

This invention relates to the construction of dividers for row crop headers of agricultural harvesting equipment.

2. Prior Art

Heretofore dividers have been provided for row crop harvesting equipment which had adjustability to accommodate different row spacing. Such constructions are shown in U.S. Pat. Nos. 3,520,121 and Re. 27,554. In U.S. Pat. No. 3,765,157, row width adjustment is accommodated by providing row dividers which have longitudinally hinged halves.

SUMMARY OF THE INVENTION

The divider structure of this invention is particularly useful for spanning the variable width space between row units adjustably mounted on a transverse beam of a row crop harvester at spacings conforming to row spacings of the crops being harvested. The longitudinally extending divider structure includes a longitudinally extending, variable width hood having a flexible plastic sheath bowing upwardly and extending between the adjacent row units. Means are provided to releasably connect laterally opposite sides of the hood to the adjacent row units. The construction and mounting of the hood is such that the flexible sheath bows upwardly at different curvatures when the adjacent row units are mounted on the transverse beam at different row spacings.

The divider structure may include an adjustable width point having a flexible plastic semi-conical deflector adjustable to different curvatures when the adjacent row units are mounted on the transverse beam at different spacings.

Further, the hood of the divider structure may include a pair of longitudinally extending frame members secured to the opposite lateral edges of the flexible sheath and the frame members may be releasably connected by fingers and pins on the adjacent row units extending through openings in the rear and front ends of the frame members.

In order to guard against damage to the sheath due to exceptionally heavy loading, a plurality of longitudinally spaced bows may be provided in supporting relation to the underside of the sheath. Further bracing may be provided by a vertically adjustable longitudinal stringer.

The use of a flexible plastic covering on the point and hood results in reduced bounce and loss of ears of corn, smoother flow of crop material, less kernel damage and longer point and hood life because of resistance to impact damage.

BRIEF DESCRIPTION OF THE DRAWINGS

One embodiment of the invention is illustrated in the drawings in which:

FIG. 2 is a pictorial view showing the divider of FIG. 1 installed on a harvester;

FIG. 3 is a view taken along the line III—III in FIG. 1;

FIG. 4 is a view taken along the line IV—IV in FIG. 1; and

FIG. 5 is a view taken along the line V—V in FIG. 2.

DETAILED DESCRIPTION OF THE DRAWINGS

Figure 1:
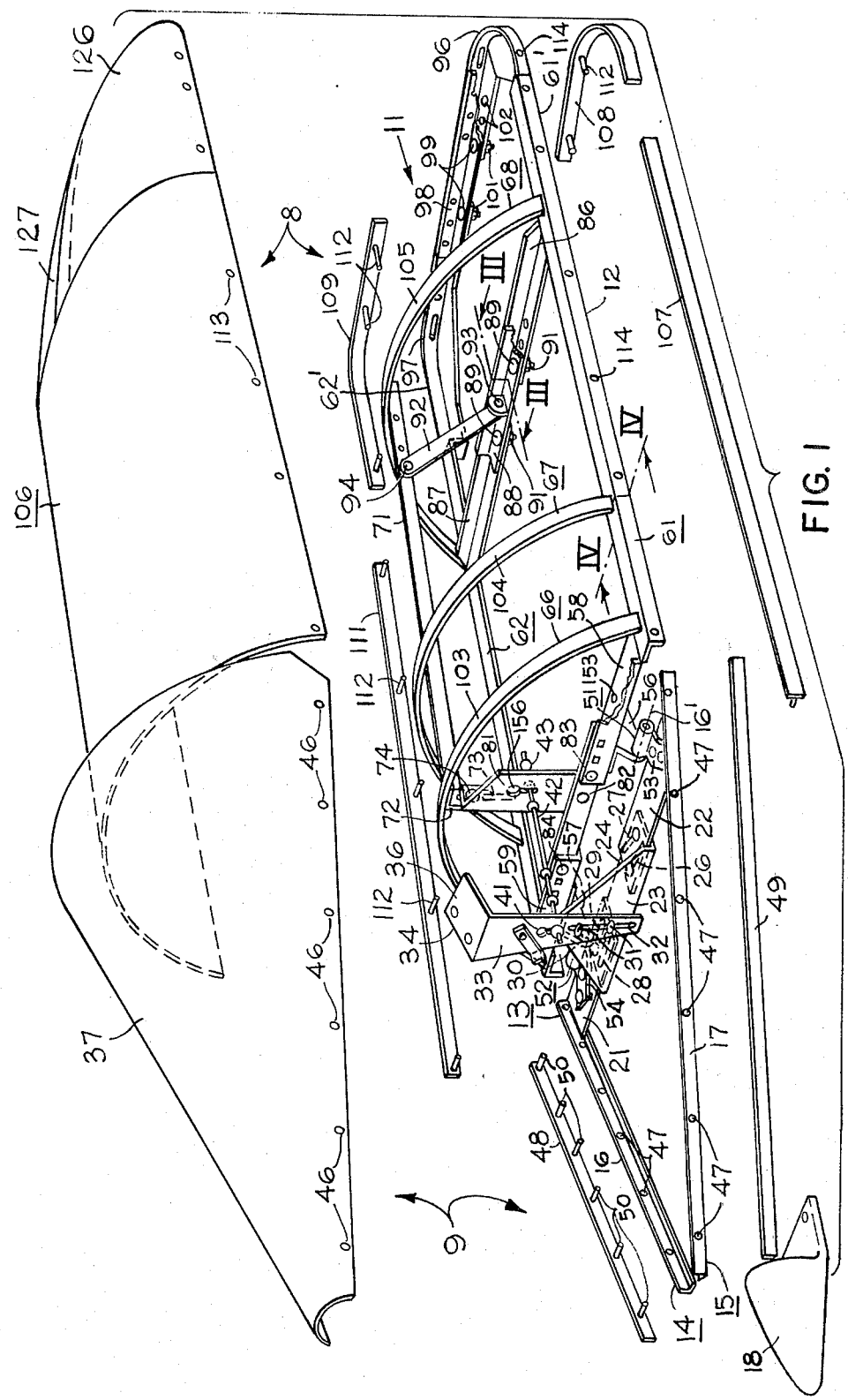
FIG. 1 is an exploded view of a divider for a row crop harvester.

Referring to FIG. 1, a longitudinally extending divider structure is illustrated which includes a hood 8 and a point 9. The hood 8 includes a skeleton-like frame 11 having a rear subframe 12 pivotally connected to a front triangular subframe 13 on a transverse point axis 16' to permit swinging movement of the front subframe 13 relative to the rear subframe 12. The front subframe 13 includes a pair of forwardly coverging sill members 14, 15 which include angles 16, 17 which in an assembled condition have their front ends bolted to a nose 18. The rear of the sill members 14, 15 includes inwardly projecting braces 21, 22 which have their laterally outer ends welded to the inner sides of the angles 16, 17. The braces 21, 22 present laterally inner ends which are spaced from one another to permit inward and outward adjustment. Adjustable connecting means in the form of a tie member or bracket 23 is provided to adjustably interconnect the rear ends of the sill members 14, 15 or more specifically to interconnect the braces 21, 22. The bracket 23 is L-shaped and includes a horizontal portion 24 with slots 26, 27, 28, 29 for receiving fastening means in a form of bolts which extend therethrough and through openings in the braces 21, 22. An upstanding portion 30 of the bracket 23 carries a pair of forwardly extending, vertically spaced bolts 31 which pass through a vertical slot 32 in a vertical portion 33 of an adjustable vertical support or brace 34. The brace 34 has a generally horizontal, rearwardly extending leg 36 in supporting relation to the rear, central underside of a conically-shaped flexible plastic sheath or deflector 37. The semi-conical deflector 37 is formed of a single integral piece of relatively thin flexible plastic material of substantially uniform thickness and diverges rearwardly to an arcuate rear edge which curves downwardly to the rear ends of laterally opposite, rearwardly diverging lower edges of the deflector 37. The upstanding portion 33 of the brace 34 also includes a keyhole-shaped opening 41 for receiving an adjustment cable 42 on which a series of spaced abutment members or stops 43 are swagged. The semi-conical deflector 37 includes openings 46 in its laterally opposite, forwardly converging edges which align or register with openings 47 in the angles 16, 17. A pair of connector strips 48, 49 have horizontally extending threaded studs or pins 50 welded thereto which in the assembled condition of the point 9 extend through openings 46 in the deflector and through the openings 47 in the angles 16, 17. In the assembled condition, nuts are screwed onto the threaded ends of the pins 50. A pair of hinges 51, 52 interconnect the front subframe 13 and the rear subframe 12. Hinge parts 53, 54 are secured by appropriate fasteners to the braces 21, 22 of sill members 14, 15 and hinge parts 56, 57 are secured by suitable fasteners to inwardly extending braces 58, 59 whose laterally outer ends are welded to a pair of laterally spaced, longitudinally extending side frame members 61, 62 of the rear subframe 12.

The rear subframe 12 includes three longitudinally spaced bracing bows 66, 67, 68 which have their laterally opposite ends releasably attached to the longitudinal frame members 61, 62, as is illustrated in FIG. 4, and are supported at the central or upper part of their arch by a vertically adjustable longitudinal stringer 71. The front of the stringer 71 includes a downwardly extending leg 72 which includes a vertical slot 73 through which a releasably fastening component in a form of a bolt 74 extends. The bolt also passes through a hole in a rearwardly extending flange of an upright support 81 rigidly secured to a transverse tie member 82. The inner ends of the braces 58, 59 are in laterally spaced relation to one another and are releasably connected to the tie member 82 by fastening means which includes bolts 83, 84. A plurality of laterally spaced openings are provided in the braces 58, 59 for receiving the bolts 83, 84 to permit the longitudinal frame members 61, 62 to be moved closer to one another. The frame members 61, 62 include a second set of inwardly extending braces 86, 87 which are welded at their laterally outer ends to angles 61', 62' and have laterally inner ends in spaced relation to one another. A tie member 88 adjustably interconnects the braces 86, 87 through its connection thereto by bolts 89 and nuts 91. Each bolt 89 extends through an opening in tie member 88 and through one of several laterally spaced openings in the inner ends of braces 86, 87. An upwardly disposed support or link 92 is pivotally connected at its lower end to the tie member 88 by a pin 93 and at its upper end to the stringer 71 by a pivot bolt 94 and a nut 95, as shown in FIG. 3.

The frame members 61, 62 of the rear subframe 12 also include curved rear end braces 96, 97 welded to the rear ends of angle elements 61', 62'. A transverse tie member 98 is releasably secured to the braces 96, 97 by bolts 99 and nuts 101. The bolts extend downwardly through appropriate vertical openings in the tie member 98 and through two of six laterally spaced openings 102 in braces 96, 97. Completing the subframe 12, three upwardly curved flexible bows 103, 104, 105 are releasably secured at their laterally outer ends in longitudinally spaced positions on the frame members 61, 62. Referring to FIG. 4, it will be noted bow 104 has a dog-leg shaped, hook-like end 121 extending into a vertical opening 122 in the frame member 61 thus providing a releasable connection.

A flexible plastic sheath 106 is secured to the rear subframe 12 by fastening strips 107, 108, 109, 111 having threaded studs 112 extending through aligned openings 113, 114 in the sheath 106 and subframe 12, respectively, and by nuts 116. FIG. 4 shows a threaded stud 112 extending through openings 113, 114 and a nut 116 screwed on the threaded end of the stud 112. The rear end of the sheath 106 includes a pair of curved quarter panels 126, 127 having laterally outer and rear edges fastened to the frame members 61, 62 and tie member 98. The upper, laterally inner edges of the panels 126, 127 are in lapped relation to one another permitting the panels to be laterally telescoped relative to one another when the width of the hood 8 is changed. The plastic sheath 106 includes a cylindrical portion 166 formed by bending a single integral piece of flexible, uniform thickness plastic sheeting.

Referring to FIG. 2, the divider structure has been installed on an adjacent pair of row units 131, 132 of an agricultural harvester. Only the frames of the laterally spaced row units 131, 132 are illustrated. The rear ends of the row units 131, 132 are releasably mounted on a transverse beam 133 by U-bolts 134 and nuts 136. The row units 131, 132 have forwardly projecting legs 137, 138, 139, 140 which straddle the adjacent rows of the crop being harvested. A pair of hooks presenting forward projecting fingers 141, 142 are secured to the rear portions of the adjacent row units 131, 132. As shown in FIG. 5, the finger 141 projects forwardly through registering openings 146, 147, 148 in strip 108, panel 126 and brace 96. It should be understood the connection between the finger 142 and the rear of the hood 8 is similar to the connection of finger 141 with the hood. The front end of the hood 8 is releasably connected to the adjacent row units 131, 132 by a pair of upstanding or vertical pins 151, 152 extending, respectively, upward through a vertical openings 153 in brace 58 and a similar opening in brace 59. One leg of a hairpin-like fastener 154 is inserted in a transverse hole in each of the pins 151, 152 to releasably lock the hood in place. The elevation of the tip 18 of the point 9 is adjustably fixed by the cable 42 with selected pairs of its stops 43 bearing against the remote sides of supports 33 and 81 with the cable 42 resting in the narrow lower portion of the keyhole-shaped opening 41 in support 33 and keyhole-shaped opening 156 in support 81.

OPERATION

The row units of a harvester are mounted on the transverse beam 133 to correspond to the row spacing of the crop being harvested. Likewise, the front and rear subframes will be adjusted for the desired row spacing. If it becomes necessary to change from the illustrated wide row spacing for which the divider structure is adjusted, as shown in FIGS. 1, 2 and 3, to a narrower row spacing, the adjustable row units 131, 132 are moved closer to one another by first loosening nuts 136 and then retightening them after moving one or both of the row units. The divider structure is made narrower by loosening or removing the bolts fastening the braces 21, 22, 58, 59, 86, 87, 96, 97 to tie members 23, 82, 88 and 98. Also, the nuts on bolts 31 and 74 are loosened and the pivot bolt 94 is removed. The rear ends of frame members 14, 15 are swung inwardly, the frame members 61, 62 are moved inwardly toward one another, the nuts on the bolts fastening braces 21, 22 are retightened and the bolts fastening braces 58, 59, 86, 87, 96, 97 are inserted in different holes in the braces and nuts are threaded thereon. Also, the nuts on bolts 31, 74 are retightened and the pivot bolt 94 is inserted in one of the other two openings 161, 162 in the stringer 71 as appear in FIG. 3, and nut 95 is reinstalled on the bolt 94. In making this narrowing adjustment, the rear edge of the semi-conical deflector and the cylindrical portion 166 of the sheath will have changed their curvatures to smaller radii. Thus, the deflector and the sheath portion 166 will have different curvatures when the width of the divider structure is changed to conform to changes in row unit spacing. The narrower the divider structure, the higher the arcs on the deflector and hood. The bows 103, 104, 105 will also bow upwardly in higher arcs in continued supporting contact with the central longitudinal underside of the sheath 106 with the stringer 71 bearing against the central undersides of the bows 103, 104, 105 to thereby providing bracing and support for the sheath 106 in event a heavy person should errantly walk upon the hood 8.

The use of a flexible plastic cover or sheath on the divider structure provides very low friction for crops sliding therealong thus inducing good flow of crop material into the harvester. When ears of corn hit the flexible plastic sheath, there is less bounce, less ear loss and less damage to kernels of grain than heretofore experienced with metal sheath. Metal sheath is prone to dent when hit by ears of corn of other objects or when walked upon, whereas the flexible, resilient plastic sheath employed in this invention retains its shape. The plastic sheath is expected to provide longer life for the divider structures on which used than experienced heretofore for metal dividers. This expectation is based on (a) low friction with attendant low wear, (b) nonrusting characteristic of plastic, and (c) resistance to denting and other deformation.

An important advantage of this invention is the ability of the manufacturer and user to change the width of the divider structure without the use of hinges and without having to loosen or remove fasteners holding divider sheets together.

The embodiments of the invention in which an exclusive property or privilege is claimed are defined as follows:

1. In a row crop harvester having a frame with a transverse beam and a plurality of row units releasably mounted on said beam at lateral spacings therebetween to conform to the row spacings of crops being harvested, the combination comprising:

a longitudinally extending divider structure between adjacent row units having a longitudinally extending, adjustable with hood including a flexible plastic sheath having a cylindrical portion formed by bending a single integral sheet of flexible plastic, said cylindrical portion bowing upwardly and extending between said adjacent row units and means releasably connecting laterally opposite sides of said hood to said adjacent row units, said flexible cylindrical portion bowing upwardly at different curvatures when said adjacent row units are mounted on said beam at different row spacings.

2. The harvester of claim 1 wherein said divider structure includes an adjustable width point pivotally connected to the front ends of said adjacent row units for swinging movement about a transverse pivot axis, said point including a flexible plastic semi-conical deflector formed of a single integral piece of relatively thin material of substantially uniform thickness, said deflector diverging rearwardly to an arcuate rear edge which curves downwardly from the central rear of the deflector to the rear ends of rearwardly diverging laterally opposite, lower edges of said deflector, said deflector being adjustable to different curvatures when said adjacent row units are mounted on said beam at different spacings.

3. The harvester of claim 1 wherein said hood includes a longitudinal stringer in confronting relation to the longitudinal central underside of said cylindrical portion and adjustable support means for each of the opposite ends of said stringer permitting its elevation to be changed when the spacing of said adjacent row units is changed.

4. The harvester of claim 1 wherein said hood includes a plurality of longitudinally spaced, upward curved reinforcing bows each extending between laterally opposite sides of said hood in upward confronting and supporting relation to the underside of said cylindrical portion without preventing arcuate deflection of the latter.

5. The harvester of claim 4 wherein said hood includes a pair of laterally spaced longitudinal frame members connected to opposite lateral edges, respectively, of said cylindrical portion of said sheath and releasably secured to said adjacent row units, respectively, first adjustable connecting means interconnecting said frame members near one longitudinal end of said cylindrical portion, second adjustable connecting means interconnecting said frame members near the outer longitudinal end of said cylindrical portion and a longitudinal stringer in supporting relation to the central underside of said longitudinal portion and vertical braces extending between said adjustable connecting means, respectively, and said stringer.

6. The harvester of claim 5 wherein said divider structure includes an adjustable width point pivotally connected at its rear end to the front ends of said frame members on a transverse pivot axis and wherein said point includes a flexible plastic bowed deflector having a forward taper.

7. The harvester of claim 6 wherein a pair of laterally spaced, rearward facing openings are formed in the rear ends of said frame members and a pair of laterally spaced vertical openings are formed in the front ends of said frame members and further comprising a pair of forwardly projecting fingers on the rear portions of said adjacent row units projecting, respectively, into said rearward facing openings, a pair of upstanding pins on the front portions of said adjacent row units, respectively, extending into said vertical openings and a releasable fastening member on each of said pins preventing upward withdrawal of said frame members from said pins.

* * * * *

UNITED STATES PATENT OFFICE
CERTIFICATE OF CORRECTION

Patent No. 4,403,467          Dated September 13, 1983

Inventor(s) Robert T. Baugh

It is certified that error appears in the above-identified patent and that said Letters Patent are hereby corrected as shown below:

Column 5, line 24, "with" should read --- width ---;

Column 6, line 26, "outer" should read --- other ---.

Signed and Sealed this

Twenty-second Day of November 1983

[SEAL]

Attest:

GERALD J. MOSSINGHOFF

Attesting Officer     Commissioner of Patents and Trademarks